Figure 1:
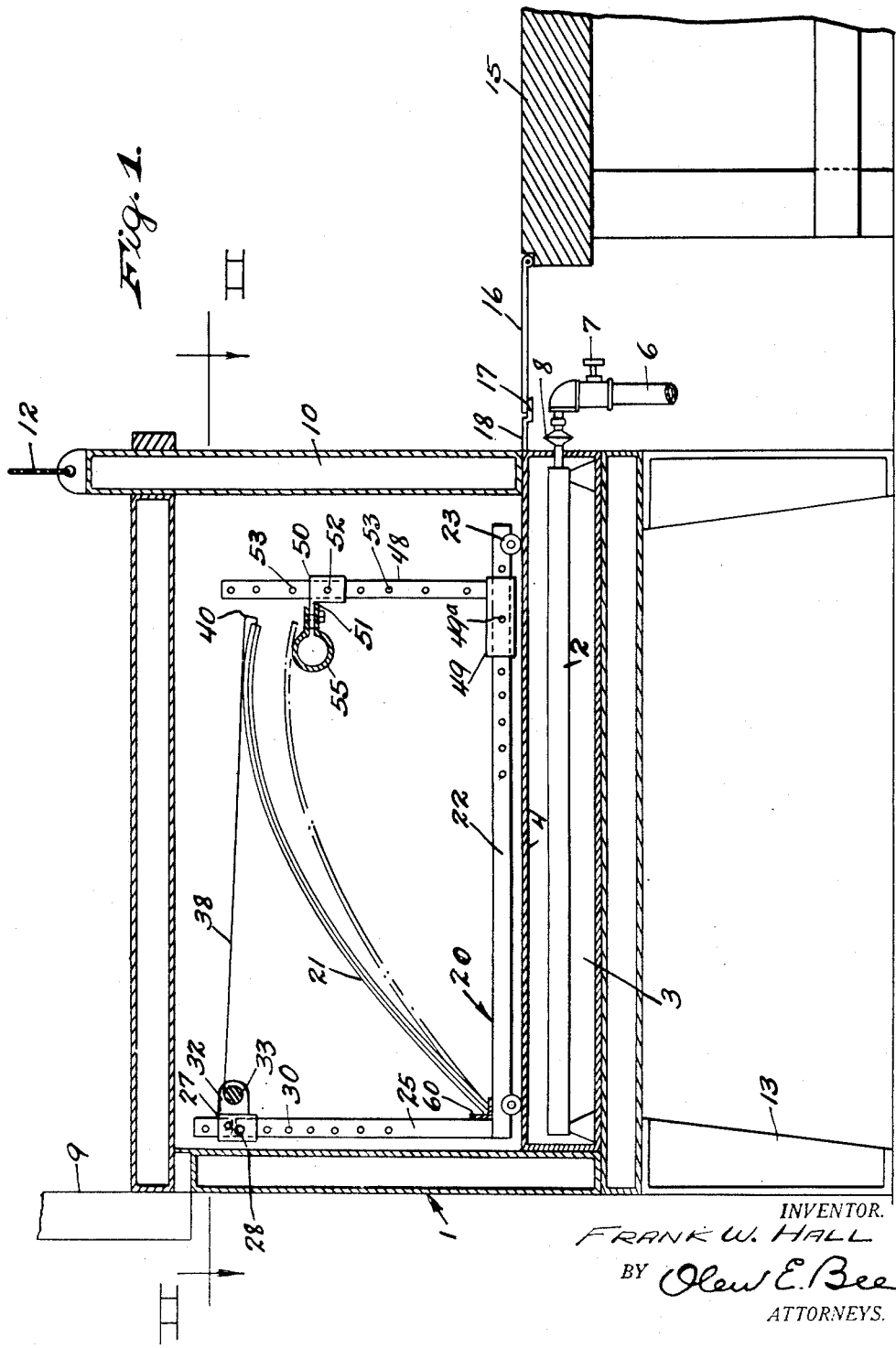

June 30, 1942.  F. W. HALL  2,288,524
PROCESS OF RECLAIMING SAFETY GLASS
Filed May 18, 1940  2 Sheets-Sheet 1

INVENTOR.
FRANK W. HALL
BY Olew E. Bee
ATTORNEYS.

June 30, 1942.  F. W. HALL  2,288,524
PROCESS OF RECLAIMING SAFETY GLASS
Filed May 18, 1940  2 Sheets-Sheet 2
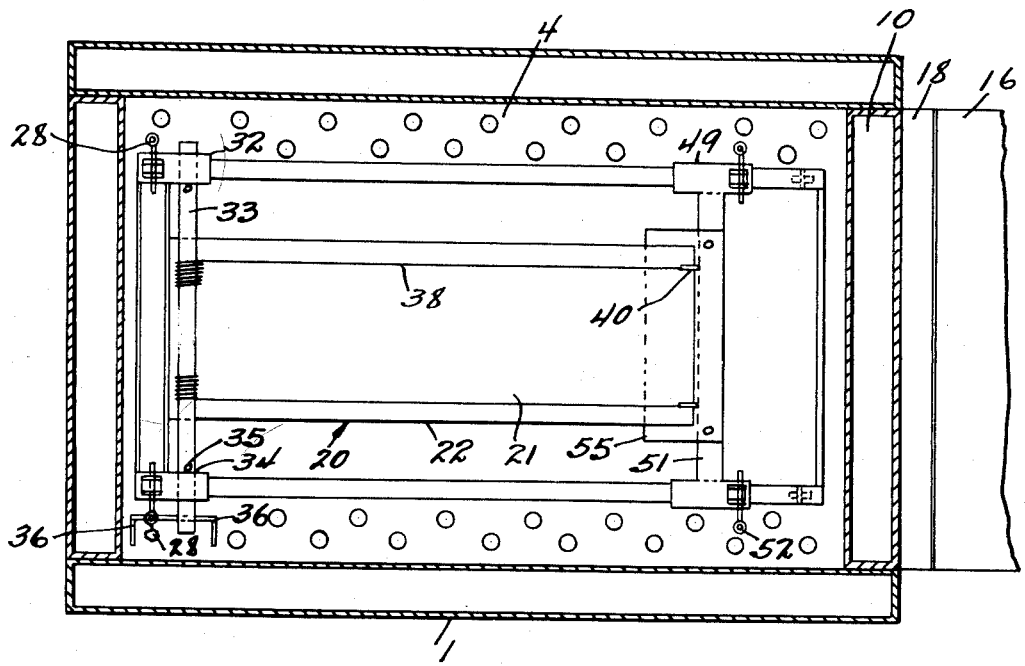
INVENTOR.
FRANK W. HALL
BY Olew E. Bee
ATTORNEYS.

Patented June 30, 1942

2,288,524

UNITED STATES PATENT OFFICE 2,288,524

PROCESS OF RECLAIMING SAFETY GLASS

Frank W. Hall, Brackenridge, Pa., assignor to Pittsburgh Plate Glass Company, Allegheny County, Pa., a corporation of Pennsylvania Application May 18, 1940, Serial No. 335,939

1 Claim. (Cl. 49—81.5)

The present invention relates to a process of reclaiming safety glass.

The primary object of the invention is the provision of a process by means of which defectively prepared laminated glass may be dismantled and the glass laminae thereof salvaged.

Other objects and advantages of the invention will become more apparent from the following detailed description of a preferred embodiment thereof.

Much progress has been made in the development of improved methods of preparing laminated safety glass and today only a small percentage of the plates processed are not acceptable for commercial usage. A corresponding advance has not been made, however, in the methods of reclaiming the defective plates.

Ordinarily the reclamation of the glass laminae of safety glass is accomplished by an acid treatment which attacks and decomposes the plastic medium bonding the glass sheets together. It will at once be obvious that this process is not one to be recommended. The acid is expensive and relatively large amounts are required to fill baths adequate for treating a number of plates simultaneously. The acid fumes constitute a recognized health hazard, while the acid coated glass sheets afford the possibility of imparting serious burns to the operators handling them. It should also be pointed out that the decomposition of the plastic interlayer materials with acid is very slow since the acid can attack the edges only and must advance progressively into the center of the plate.

Although this acid treatment has been successfully used in connection with safety glass wherein a cellulosic plastic forms the interlayer, the newer forms of safety glass incorporating synthetic resin plastics do not react in the same manner. The acrylate resins and those of the vinyl acetal type are highly resistant to decomposition by acids. Accordingly other means of obtaining the desired separation of the glass laminae had to be devised.

One such method is disclosed in my Patent No. 2,156,688, dated May 2, 1939, wherein a laminated plate is heated to soften the plastic interlayer and with one sheet of glass held, the other sheet of glass is mechanically forced thereover until it is freed from the assembly.

Briefly stated, the present invention contemplates the supporting of a laminated plate in such manner that upon heating the assembly to soften or decompose the plastic interlayer one of the glass lamina of the plate is free to drop away from the assembly. In other words the separation of the glass plates is effected without the use of mechanical force.

In the accompanying drawings, wherein like numerals are used to designate like parts through the same:

Figure 1 is a vertical sectional view through an apparatus suitable for carrying out the invention; Figure 2 is a horizontal sectional view taken substantially along the line II—II of Figure 1; Figure 3 is an enlarged detail view of the plate supporting means employed in the apparatus; and Figure 4 is a plan view on an enlarged scale of one element of the plate supporting means.

Referring to the drawings, a furnace 1 of insulated double wall construction, is heated by means of gas burners 2 lying within a chamber 3 extending across the floor of the furnace and covered by a perforated plate 4, which also forms the working floor of the furnace. The burners 2 are supplied with gas from a line 6, suitable control valves 7 and air mixers 8 being connected in the line to insure regulation of a proper combustible mixture. A flue 9 affords an outlet for the products of combustion and may include a damper (not shown) as a further means of controlling the furnace temperatures. A vertically sliding door 10 of insulated double wall construction serves to close the furnace and may be opened by the operation of cables 12, counterbalanced in the customary manner. The entire furnace is mounted on legs 13 in order that the working floor 4 thereof will be at the same elevation as the table 15, to facilitate loading and unloading. A metal leaf 16 is hinged to the table 15 to bridge the space between it and the furnace and seats upon an offset lip 17 of a flange 18 extending from the furnace.

The furnace 1 is of a size sufficient to receive a rack 20 upon which a laminated plate 21, the subject of the reclamation process, is supported. The rack 20 comprises a skeleton base 22 of metal bars provided at each corner with a roller 23 to increase the mobility of the rack. At one end of the rack, vertically projecting bars 25 are secured and they in turn receive sleeves 27 adjustably positioned thereon by means of pins 28 extending through the sleeves 27 and engageable in any of the openings 30 suitably spaced along the bars 25. The sleeves 27 are provided with shoulders 32 in which is mounted a horizontal shaft 33 in suitable bearings 34, and pins 35 prevent lateral or axial movement of the shaft which is rotatable by a crank 36 secured at one end thereof. Cables 38, attached to and controlled by the shaft 33, carry at their free ends clips 40, which support the plate 21. The clips 40 are provided at one end with an opening 42, in which the cable 38 is secured and at the opposite end with a reversed flange 43 spaced from the body and notched to form teeth 44.

At the opposite end of the rack 20, bars 48 project vertically from sleeves 49 which are adjustably positioned along the side members 22 of the rack and secured against movement thereon by means of locking pins 49a. Sleeves 50 joined by a horizontal member 51 are adjustably positioned upon the bars 48 by means of pins 52 extending through the sleeves 50 and engaging openings 53 suitably spaced along the bars 48. A bumper 55 of rubber or other resilient material is secured to the member 51 and protects the section of glass dropping away from the plate 21.

In the operation of the apparatus, the rack 20 is rolled to the table 15 and the plate 21 positioned thereon in such relation that it is disposed at an angle to the horizontal with its lower edge abutting an angle member 60 at the lower rear portion of the rack 20. The teeth 44 (Fig. 3) engage between the glass laminae 61 of the plate 21 at the upper edges of the latter in such manner that the lower lamina 61 is free to drop and separate from the plate 21. Adjustment of the sleeves 27 and cables 38 insure proper support of the plate 21 at a correct angle. The sleeves 49 are moved along the rack until the bumper 55 lies beneath the outer edge of the plate 21 and the sleeves 50 are adjusted to bring the bumper 55 into close proximity of the edge of the plate. The loaded rack is rolled into the furnace and held therein until the plastic inner layer of the plate 21 is softened or decomposed by the heat to which it is exposed, sufficiently at least to destroy its adhesion to the glass laminae 61. The lower glass lamina 61, being unsupported, drops away from the assembly onto the bumper 55. The temperature necessary for the softening of the resin inner layer will, of course, vary somewhat depending upon the type of resin and the degree of its plasticization. Under ordinary circumstances, a temperature of approximately 350° F. will be sufficient to decompose or soften a vinyl acetal or acrylic acid ester resin and destroy its adhesion to the glass laminae. The rack is then removed from the furnace and unloaded.

My process is particularly adapted to the reclamation of curved laminated glass, although it will work equally as well with flat plates of safety glass.

What I claim is:

A process of reclaiming the glass laminae of a composite safety glass plate which comprises supporting a laminated plate in an inclined position by securing the upper glass lamina of the plate against movement, exposing the laminated plate to an atmosphere heated sufficiently to soften the medium bonding the glass laminae together to such an extent as to cause the unsupported glass lamina to drop away from the plate under the influence of gravity.

FRANK W. HALL.